US008290669B2

(12) United States Patent
Ellis

(10) Patent No.: US 8,290,669 B2
(45) Date of Patent: Oct. 16, 2012

(54) SYSTEM AND METHOD FOR CONTROLLING AN ENGINE

(75) Inventor: Nathaniel C. Ellis, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/981,253

(22) Filed: Dec. 29, 2010

(65) Prior Publication Data

US 2012/0173100 A1  Jul. 5, 2012

(51) Int. Cl.
*G06F 7/00* (2006.01)
*G06F 17/00* (2006.01)
*G06F 19/00* (2006.01)

(52) U.S. Cl. .......................................................... 701/54
(58) Field of Classification Search ...................... 701/54
See application file for complete search history.

(56) References Cited

U.S. PATENT DOCUMENTS

| 4,181,103 | A | 1/1980 | Sturdy |
| 5,089,965 | A | 2/1992 | Braun |
| 5,569,115 | A | 10/1996 | Desautels et al. |
| 5,638,271 | A | 6/1997 | White et al. |
| 6,108,600 | A | 8/2000 | Lehner et al. |
| 7,214,162 | B2 * | 5/2007 | Shimada ...................... 477/107 |
| 7,416,515 | B2 | 8/2008 | Iriyama et al. |
| 7,468,018 | B2 | 12/2008 | Radich |
| 2007/0207896 | A1 * | 9/2007 | Radich .......................... 477/107 |
| 2008/0255739 | A1 * | 10/2008 | Murayama et al. .............. 701/54 |
| 2010/0042299 | A1 * | 2/2010 | Doebele et al. .................. 701/51 |
| 2010/0312440 | A1 * | 12/2010 | Ellis et al. ........................ 701/54 |

FOREIGN PATENT DOCUMENTS

| JP | 2006-257977 A | 9/2006 |
| JP | 2008-267186 A | 11/2008 |

* cited by examiner

*Primary Examiner* — James Trammell
*Assistant Examiner* — Michael D Lang
(74) *Attorney, Agent, or Firm* — Kenealy Vaidya LLP

(57) ABSTRACT

A system for controlling an engine of a vehicle can include: an engine, a transmission, a coupling, and a controller. The controller can be configured to adjust a speed of the engine output shaft based on a comparison of a shaft speed of the input shaft with a shaft speed limit when an operator of the vehicle changes from a first one of the plurality of speed ratios to a second one of the plurality of speed ratios. This control can occur during a downshift, for example, when the second one of the plurality of speed ratios is numerically greater than the first one of the speed ratios. Thus, the controller can be configured to protect the engine and the vehicle from shift shock when a sensor in the control system for the transmission has failed. Also, a method for controlling an engine of a vehicle during a downshift in a transmission driven by the engine can include comparing a current speed of an input shaft of the transmission to a shaft speed limit when a change from a first one of a plurality of speed ratios of the transmission to a second one of a plurality of speed ratios of the transmission occurs, where the first one of the plurality of speed ratios is numerically less than the second one of the plurality of speed ratios.

20 Claims, 2 Drawing Sheets

SYSTEM AND METHOD FOR CONTROLLING AN ENGINE

BACKGROUND

1. Field

The presently disclosed subject matter relates to devices, systems, and processes useful as a control for an engine

2. Description of the Related Art

Existing vehicles powered by an internal combustion engine have typically used one of the following transmission types: an automatic transmission that shifts speed ratios without direct input from the operator of the vehicle; a manual transmission that requires direct input from an operator of a vehicle; or a semi-automatic transmission that can shift gears with or without direct input from the operator. During a downshift from a lower speed ratio to a higher speed ratio, acceleration can be imparted to the input shaft of the transmission when the engine crankshaft speed exceeds the transmission input speed. This acceleration, also known as shift shock, can be perceived by a passenger in the vehicle and regarded as unfavorable. The dynamic conditions of the vehicle and/or the experience of the operator can influence the operator's ability to minimize or avoid shift shock.

Thus, there is a need to provide a control system and method to assist the operator when downshifting speed ratios in a transmission so that shift shock can be minimized or, if possible, avoided.

SUMMARY

According to one aspect of the disclosure, a system for controlling an engine of a vehicle can include: an engine, a transmission, a coupling and a controller. The engine can include an output shaft. The transmission can include an input shaft, an output shaft, and a plurality of speed ratios. The coupling can be intermediate the engine output shaft and the input shaft. The controller can be configured to adjust a speed of the engine output shaft based on a comparison of a shaft speed of the input shaft with a shaft speed limit when an operator of the vehicle changes from a first one of the plurality of speed ratios to a second one of the plurality of speed ratios, wherein the second one of the plurality of speed ratios is numerically greater than the first one of the speed ratios.

According to another aspect of the disclosed subject matter, a method for controlling an engine of a vehicle during a downshift in a transmission driven by the engine can include comparing a current speed of an input shaft of the transmission to a shaft speed limit when a change from a first one of a plurality of speed ratios of the transmission to a second one of a plurality of speed ratios of the transmission occurs, where the first one of the plurality of speed ratios is numerically less than the second one of the plurality of speed ratios.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

Figure 1:
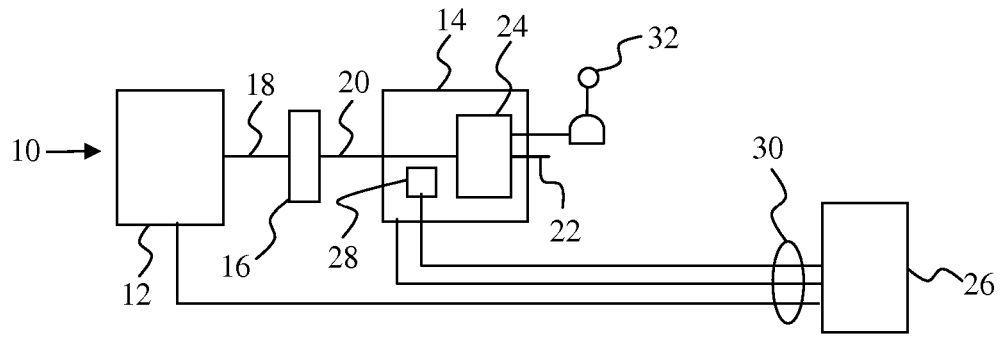
FIG. 1 is a schematic view of a powertrain for a vehicle made in accordance with principles of the disclosed subject matter.

FIG. 1 illustrates an embodiment of a powertrain 10 for a vehicle made in accordance with the principles of the disclosed subject matter. The powertrain 10 can include an internal combustion engine 12, a transmission 14, a coupling 16 and a control assembly. The engine 12 can include an output shaft 18. The transmission 14 can include an input shaft 20, an output shaft 22, and a speed ratio assembly 24. The control assembly can include a controller 26, a speed sensor 28, a plurality of electrical communication lines 30 and a selector 32.

The transmission 14 can be configured as an automatic transmission, a manual transmission, or a semi-automatic transmission, as known in the art. The speed ratio assembly 24 can include a plurality of speed ratios that can connect the input shaft 20 to the transmission output shaft 22 such that the transmission output shaft 22 can rotate at variable speeds relative to the input shaft 20, in any manner know in the art. For example, the speed ratio assembly 24 can be a stepped speed ratio assembly (e.g., a gear train) where the plurality of speed ratios are provide in discrete steps. Or, the speed ratio assembly 24 can be a continuously variable speed ratio assembly (e.g., a variable pulley and belt assembly or a toroidal roller assembly) where the plurality of speed ratios vary continuously from a numerically maximum ratio to a numerically minimum ratio. The transmission output shaft 22 can be connected to the drive wheels of the vehicle in any manner known in the art.

The coupling 16 can connect the engine output shaft 18 to the input shaft 20. The coupling 16 can permit the engine output shaft 18 to rotate relative to the input shaft 20. Examples of the coupling 16 can include, but are not limited to, a torque converter and a friction disc clutch.

The controller 26 also can be referred to as an electronic control unit (ECU) or as a central processing unit. The ECU 26 can be configured with hardware, alone, or with software, to perform the desired task(s) in any manner known in the art. The ECU 26 can be configured to receive data from the sensor 28 with or without a request from the ECU 26 for the data.

The speed sensor 28 can be any rotary motion sensor known in the art. The sensor 28 can be configured with hardware, alone, or with software, to perform the desired task(s). The sensor 28 can be configured as a smart sensor such that the sensor 28 can process the raw data collected by the sensor 28 prior to transmission to the ECU 26. Alternatively, the sensor 28 can be configured as a simple sensor that passes the raw data directly to the ECU 26 without any manipulation of the raw data. By way of example only, the raw data could include a number of revolutions and a time period during which the number of revolutions were counted by the sensor 28. If the sensor 28 is configured as a smart sensor, the sensor 28 could convert the raw data into data representing the number of revolutions per unit of time and then send this processed data to the ECU 26. In another exemplary embodiment of the sensor 28 configured as a smart sensor, the sensor 28 could be configured to compare the processed data to a threshold value and send the result of the comparison to the ECU 26. The sensor 28 can be configured to send data to the ECU 26, with or without a prompt from the ECU 26.

The electrical communication lines 30 can connect the ECU 26 to the engine 12, to the transmission 14 and to the sensor 28 in any manner known in the art. The electrical communication between the ECU 26 and each of the engine 12, the transmission 14 and the sensor 28 can be either one-way communication or two-way communication and can be networked or not networked, and could also conceivably be accomplished in a wireless manner.

The selector 32 can be connected to the transmission 14 to permit an operator of the vehicle to change the speed ratio in use in the transmission 14. The selector 32 can be connected to the transmission 14 mechanically, electrically, or electro-mechanically, in any manner known in the art. The electrical or electro-mechanical connection can pass through the ECU 26, as is known in the art. The selector 32 can permit an operator of the vehicle to effect a shift from one speed ratio to another speed ratio within the transmission 14 upon actuation of the selector 32, regardless of the type of the transmission 14 (i.e., automatic, manual, or semi-automatic) or the type of the speed ratio assembly 24 (i.e., geared or continuously variable). The selector 32 can be a mechanical lever, an electrical switch, or a plurality of electrical switches, as is known in the art. The selector 32 can be mounted in any one of a plurality of different locations within the vehicle passenger compartment, including but not limited to, on a center console, on a steering column, on a steering wheel, and on an instrument panel.

Figure 2:
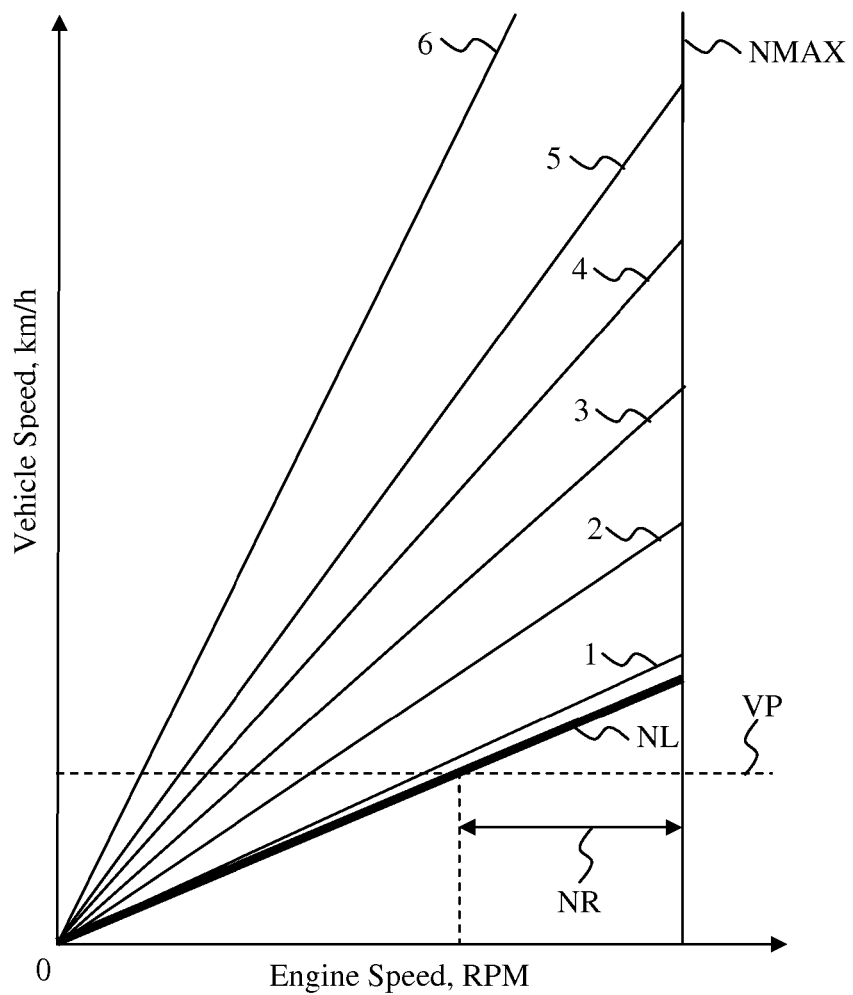
FIG. 2 is a graph depicting a plurality of plots of engine speed versus vehicle speed in accordance with the disclosed subject matter.

In the illustrative example depicted by FIG. 2, the transmission 14 is configured such that the speed ratio assembly 24 includes six speed ratios in discrete steps, where the first speed ratio is the numerically largest ratio of the plurality and the sixth speed ratio is the numerically smallest ratio of the plurality. However, any number of speed ratios can be provided and these speed ratios can vary in discrete steps or continuously from the numerically largest ratio to the numerically smallest ratio, as necessary or desired.

FIG. 2 shows a respective plot 1-6 of speed of the engine output shaft 18 (i.e., engine speed) versus the traveling speed of the vehicle for each of the six speed ratios, where plot 1 corresponds to the numerically largest speed ratio (also referred to as the first speed or the first gear), plot 2 corresponds to the second largest speed ratio (also referred to as the second speed or the second gear), etc. As evidenced by the plots 1-6 of FIG. 2, when downshifting (i.e., going from a numerically smaller speed ratio to a numerically larger speed ratio) at a given traveling speed VP of the vehicle, the rotational speed of the transmission input shaft 20 will increase. Thus, in order to provide a smooth downshift, as perceived by a person in the vehicle, the speed of the engine output shaft 18 should be increased to match, as close as possible, the new transmission input shaft speed. That is, the smaller the differential between the engine output shaft speed and the transmission input shaft speed, the smoother the downshift will be, as perceived by the person in the vehicle.

An operator of the vehicle can modulate the speed of the engine output shaft 18 continuously from zero to a maximum speed via displacement of an accelerator pedal (not shown) connected to the engine 12 in any manner known in the art. Typically, a maximum speed (also referred to as the redline speed) is programmed into the ECU 26 as an upper speed limit to minimize damage to the engine 12 that can be caused by excessive engine speeds. The redline speed is independent of the traveling speed of the vehicle and is represented by a vertical plot NMAX in FIG. 2. Operation of the ECU 26 and associated component(s) for limiting the engine speed to the redline speed is well known in the art and is not discussed further.

With such a wide range of possible engine speeds, an operator of the vehicle might not be able to accurately and/or precisely modulate the accelerator pedal such that the engine output shaft speed substantially approximates the transmission input shaft speed. As mentioned above, the operator can induce shift shock if the operator modulates the speed of the engine output shaft 18 to exceed the speed of the transmission input shaft 20 at the downshift. Thus, the ECU 26 can be configured to assist the operator in obtaining smooth downshifts and can minimize or eliminate shift shock during the downshift.

Data from the sensor 28 can be analyzed by the ECU 26 such that the ECU 26 can modulate the speed of the engine output shaft 18 to substantially equal the speed of the transmission input shaft 20, as detected by the sensor 28. However, it might be possible for the sensor 28 to provide imprecise data to the ECU 26, or the ECU 26 might not receive the data obtained by the sensor 28.

In the first of these scenarios, the sensor 28 can report to the ECU 26 that the transmission input shaft 20 is rotating faster than it actually is. If the ECU 26 modulates the speed of the engine output shaft 18 to match a reported speed that is faster than the actual speed of the transmission input shaft 20, then shift shock can occur. Thus, it is desired to permit the ECU 26 to compensate for data from the sensor 28 that represents a speed faster than actual speed of the transmission input shaft 20.

A speed limit can be useful to allow the ECU 26 to better approach the goal of minimizing shift shock, especially when there is an error with the data from the sensor 28. As can be seen from the redline speed plot NMAX of FIG. 2, the redline speed for the engine output shaft 18 can be large compared to the speed of the input shaft 20 at slow vehicle speeds and at downshifts to the numerically highest speed ratios (e.g., first through third speeds), which makes it more difficult to avoid or minimize shift shock in these ranges. Thus, a secondary speed limit can be advantageous when the ECU 26 receives imprecise data or does not receive data from the sensor 28, to provide better shift shock prevention in more susceptible ranges.

This secondary speed limit can be a constant value, like the redline speed limit, or it can be a variable speed limit. If the secondary speed limit is a constant value, then it should be less than the redline speed limit. If the secondary speed limit is a variable speed limit then it can vary from zero to the redline speed limit. In this exemplary embodiment, the secondary speed limit can vary in accordance with the traveling speed of the vehicle from zero to the redline speed limit. Also, the secondary speed limit can be set as a function of one of the plurality of speed ratios of the speed ratio assembly 24.

In FIG. 2, the secondary speed limit is represented by the plot NL and is based on the numerically largest speed ratio (i.e., the first speed ratio). Further, the secondary speed limit can be set such that the plot NL of the secondary speed limit is unique as compared to the plots 1-6 for the plurality of speed ratios that can be provided by the speed ratio assembly 24. Thus, the secondary speed limit can be described by the equation:

$$NL = (VP) \times (LGR) \times (z);$$

where VP is the traveling speed of the vehicle when the downshift occurs, LGR is the ratio of the numerically largest speed ratio of the speed ratio assembly 24 and z is a coefficient and has a value equal to or less than 1. Alternatively, a speed offset could be used such that z is added to the above equation (instead of being a multiplier in the above equation).

In the example depicted in FIG. 2, the maximum speed at which the output shaft 18 can rotate subsequent to a downshift can be reduced by an amount NR from the redline speed (plot NMAX) to the secondary speed limit (plot NL). When this secondary speed limit is a function of the traveling speed, a closer approximation of the transmission input shaft speed can be made by the ECU 26 when data from the sensor 28 is imprecise or is unavailable to the ECU 26, as compared to the redline speed limit or to a constant secondary speed limit that is less than the redline speed limit.

In order to assist modulation of the speed of the engine output shaft 18 by the operator of the vehicle, the ECU 26 can receive data from the transmission 14 and/or the selector 32 that can indicate whether a shift from a numerically lower speed ratio to a numerically higher speed ratio has occurred. The ECU 26 can rely on data from the engine 12 and the sensor 28 to determine the speed of the engine output shaft 18 and, the speed of transmission input shaft 20, respectively, when the shift from a numerically lower speed ratio to a numerically higher speed ratio occurs. When the ECU 26 determines that a downshift has occurred, the ECU 26 can determine the best speed at which to operate the engine output shaft 18 so that a smooth downshift can be perceived by person in the vehicle.

Figure 3:
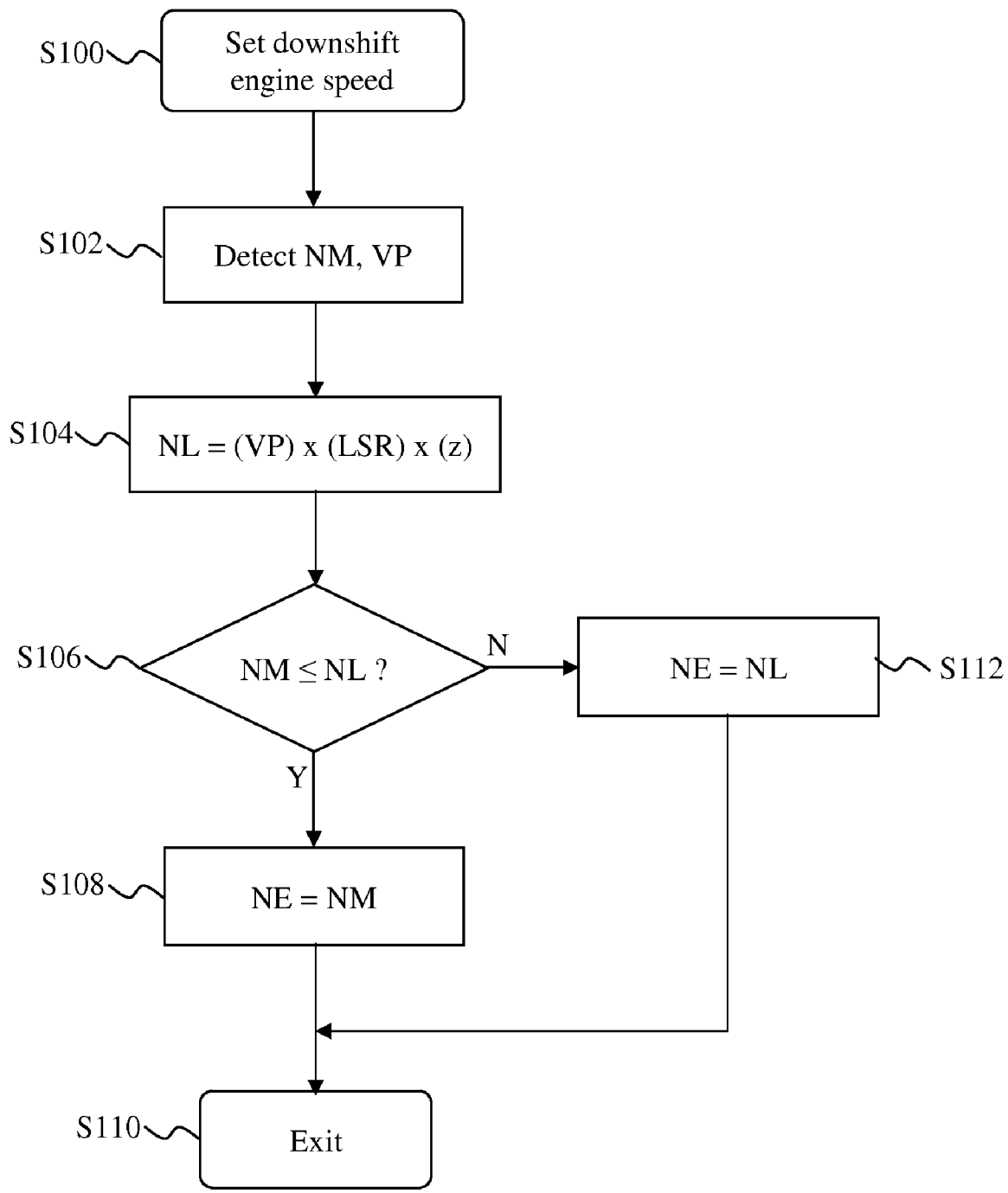
FIG. 3 is a flowchart depicting an algorithm in accordance with the disclosed subject matter.

FIG. 3 illustrates a flowchart of an exemplary algorithm that the ECU 26 can follow to assist the operator to modulate the speed of the engine output shaft 18 so that a smoothest possible downshift can be obtained.

The ECU 26 can begin the algorithm at step S100 when the ECU 26 determines that a downshift has occurred. Then, the ECU 26 can move to step S102, where the ECU 26 can collect data representing the speed NM of the transmission input shaft 18 and the traveling speed VP of the vehicle when the downshift occurs. As described above, input shaft speed NM can be provided by the sensor 28. The traveling speed VP can be provided in any manner known in the art. If the secondary speed limit is a constant value or independent of the traveling speed VP, then the ECU 26 does not need to acquire data indicative of the traveling speed at this or any other step of the algorithm.

From step S102, the ECU 26 can move to step S104, where the ECU 26 can calculate the secondary speed limit NL according to the above described equation. However, step S104 can be modified such that the ECU can perform a calculation of the secondary speed limit NL according to any desired equation. Alternatively, step S104 can be omitted where the secondary speed limit is a constant value. Then, the ECU 26 can move to step S106.

At step S106, the ECU 26 can compare the measured transmission input shaft speed NM to the secondary speed limit NL. If the measured shaft speed NM is less than or equal to the secondary speed limit NL, then shift shock can be minimized or avoided because the input speed NM reported by the sensor 28 is likely reliable. If the ECU 26 determines at step S106 that the measured shaft speed NM is less than the secondary speed limit NL, then the ECU can proceed to step S108.

At step S108, the ECU 26 can target the engine output speed NE to be substantially equal to the measured shaft speed NM. Then, the ECU 26 can operate the engine output shaft 18 at the speed NE in any manner known in the art.

Upon completion of step S108, the ECU 26 can move to step S110 where the ECU 26 can exit the algorithm and the downshift assist by the ECU 26 can be complete.

If at step S106 the ECU 26 determines that the measured shaft speed NM is greater than the secondary shaft speed NL, then the measured shaft speed NM might have been incorrectly assessed by the sensor 28. As a result, the ECU 26 can move to step S112 of the algorithm. Here, the ECU 26 can target the engine output shaft speed NE to be substantially equal to the secondary shaft speed NL so that shift shock can be minimized or avoided. It should be noted that the engine speed can use the NL speed as a target. The way the software (or hardware) can be configured to work is to not activate the throttle automatically if NM>NL. Thus, the main goal may not necessarily be solely to avoid shift shock (although this can be beneficial); it may also or primarily be to avoid sudden acceleration. Then, the ECU 26 can operate the engine output shaft 18 at the speed NE in any manner known in the art.

Upon completion of step S112, the ECU 26 can move to step S110 where the ECU 26 can exit the algorithm and the downshift assist by the ECU 26 can be complete.

While certain embodiments of the disclosed subject matter are described above, it should be understood that the disclosed subject matter can be embodied and configured in many different ways without departing from the spirit and scope of the invention. The algorithm according the disclosed subject matter can be used with any type of transmission 14 or any type of speed ratio assembly 24 described above. In an alternate exemplary embodiment, the ECU 26 can determine a downshift from a sensor associated with either one or both of the speed ratio assembly 24 and the selector 32. In yet another alternate embodiment, the ECU 26 can receive sensor data from additional sensors, such as but not limited to, a clutch pedal position sensor or a clutch plate position sensor to determine whether a shift has occurred.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A system for controlling an engine of a vehicle comprising:
an engine including an engine output shaft;
a transmission including an input shaft, an output shaft, and a plurality of speed ratios;
a coupling intermediate the engine output shaft and the input shaft; and
a controller configured to adjust a speed of the engine output shaft to be substantially equal to a speed of the input shaft when an operator of the vehicle changes from a first one of the plurality of speed ratios to a second one of the plurality of speed ratios and a speed of the vehicle is within a first speed range, and the controller is configured to adjust the speed of the engine output shaft based on a comparison of the shaft speed of the input shaft with a shaft speed limit when an operator of the vehicle changes from the first one of the plurality of speed ratios to the second one of the plurality of speed ratios and the speed of the vehicle is within a second speed range different from the first speed range;
wherein the second one of the plurality of speed ratios is numerically greater than the first one of the speed ratios.

2. The system according to claim 1, further comprising a sensor adjacent the input shaft, in electrical communication with the controller, and configured to sense rotational motion of the input shaft and communicate data to the controller indicative of the sensed rotational motion.

3. The system according to claim 1, wherein the shaft speed limit is variable.

4. The system according to claim 3, wherein the engine has a redline speed limit for the engine output shaft and the shaft speed limit is less than or equal to the redline speed limit.

5. The system according to claim 3, wherein the shaft speed limit is a function of one of the plurality of speed ratios.

6. The system according to claim 1, wherein the shaft speed limit is a function of a current traveling speed of the vehicle measured when the change from the first one of the plurality of speed ratios to the second one of the plurality of speed ratios occurs.

7. The system according to claim 1, wherein the shaft speed limit (NL) is described by the equation:

$$NL=(VP)\times(LGR)\times(z)$$

where VP is the current traveling speed of the vehicle measured when the change from the first one of the plurality of speed ratios to the second one of the plurality of speed ratios occurs, LGR is a numerically largest one of the plurality of speed ratios, and z <1.

8. The system according to claim 1, wherein the shaft speed limit (NL) is described by the equation:

$$NL=((VP)\times(LGR))+(z)$$

where VP is the current traveling speed of the vehicle measured when the change from the first one of the plurality of speed ratios to the second one of the plurality of speed ratios occurs, LGR is a numerically largest one of the plurality of speed ratios, and z is a speed offset.

9. The system according to claim 1, wherein the controller is configured to operate the engine output shaft at a speed that is substantially equal to the shaft speed when the shaft speed is less than or equal to the shaft speed limit.

10. The system according to claim 1, wherein the controller is configured to operate the engine output shaft at a speed that is substantially equal to the shaft speed limit when the shaft speed is greater than the shaft speed limit.

11. The system according to claim 1, wherein the controller is configured to not operate the engine output shaft when the input shaft speed that is sensed is greater than the shaft speed limit.

12. A method for controlling an engine of a vehicle during a downshift in a transmission driven by the engine comprising:
setting a speed of the engine to be substantially equal to a current speed of an input shaft of the transmission when a change from a first one of a plurality of speed ratios of the transmission to a second one of the plurality of speed ratios of the transmission occurs and speed of the vehicle is within a first speed range; and
comparing the current speed of the input shaft of the transmission to a shaft speed limit when a change from the first one of the plurality of speed ratios of the transmission to the second one of the plurality of speed ratios of the transmission occurs and speed of the vehicle is within a second speed range different from the first speed range, where the first one of the plurality of speed ratios is numerically less than the second one of the plurality of speed ratios.

13. The method according to claim 12, further comprising:
setting the speed of an engine output shaft to be substantially equal the current speed of the input shaft of the transmission when the current speed is less than or equal to the shaft speed limit.

14. The method according to claim 12, further comprising:
setting a speed of an engine output shaft to be substantially equal to the shaft speed limit when the current speed is greater than the shaft speed limit.

15. The method according to claim 12, further comprising:
prior to comparing the current speed of the input shaft of the transmission to the shaft speed limit, determining the shaft speed limit as a function of at least one variable.

16. The method according to claim 15, wherein determining includes determining the shaft speed limit as a function of one of the plurality of speed ratios.

17. The method according to claim 15, wherein determining includes determining the shaft speed limit as a function of a current traveling speed of the vehicle measured when the change from the first one of the plurality of speed ratios to the second one of the plurality of speed ratios occurs.

18. The method according the claim 12, further comprising:
prior to comparing the current speed of the input shaft of the transmission to the shaft speed limit, detecting a current traveling speed of the vehicle when the change from the first one of the plurality of speed ratios to the second one of the plurality of speed ratios occurs; and
determining the shaft speed limit (NL) according to the equation:

$$NL=(VP)\times(LGR)\times(z)$$

where VP is the current traveling speed of the vehicle, LGR is a numerically largest one of the plurality of speed ratios, and z <1.

19. The method according the claim 12, further comprising:
prior to comparing the current speed of the input shaft of the transmission to the shaft speed limit, detecting a current traveling speed of the vehicle when the change from the first one of the plurality of speed ratios to the second one of the plurality of speed ratios occurs; and
determining the shaft speed limit (NL) according to the equation:

$$NL=(VP)\times(LGR)+(z)$$

where VP is the current traveling speed of the vehicle, LGR is a numerically largest one of the plurality of speed ratios, and z is a speed offset.

20. The method according to claim 12, wherein the shaft speed limit is different from a maximum rpm limit redline of the engine.

* * * * *